United States Patent [19]

Olson

[11] Patent Number: 4,720,999

[45] Date of Patent: Jan. 26, 1988

[54] UNIVERSAL PRESSURE TRANSDUCER

[75] Inventor: Robert E. Olson, San Jose, Calif.

[73] Assignee: The United States of America as represented by the Secretary of the Air Force, Washington, D.C.

[21] Appl. No.: 880,245

[22] Filed: Jun. 30, 1986

[51] Int. Cl.[4] ............................. G01L 7/08; G01L 9/04
[52] U.S. Cl. ......................................... 73/706; 73/708; 73/726
[58] Field of Search ................. 73/706, 726, 727, 720, 73/721, 711, 4, 708

[56] References Cited

U.S. PATENT DOCUMENTS

| | | | |
|---|---|---|---|
| 2,871,698 | 2/1959 | Bagby | 73/147 |
| 2,906,980 | 9/1959 | Traite | 338/4 |
| 2,976,865 | 3/1961 | Shipley | 128/2.05 |
| 3,048,770 | 8/1962 | Nye et al. | 323/64 |
| 3,161,821 | 12/1964 | Price et al. | 323/75 |
| 4,131,088 | 12/1978 | Reddy | 123/32 EJ |
| 4,199,991 | 4/1980 | Kodama | 73/706 |
| 4,300,395 | 11/1981 | Shirouzu et al. | 73/727 |
| 4,445,385 | 5/1984 | Endo | 73/706 |

Primary Examiner—Donald O. Woodiel
Attorney, Agent, or Firm—William G. Auton; Donald J. Singer

[57] ABSTRACT

A pressure transducer system which uses a Wheatstone bridge circuit to produce an electrical signal which is proportional to the amount of pressure exerted on it by gas or liquids, is disclosed. The Wheatstone bridge circuit is thermally isolated from the external environment using two diaphragms which are separated by a reservoir of silicone oil. This allows pressure to be hydraulically conveyed to the Wheatstone bridge circuit while preventing thermal contamination of the electrical signals produced by the Wheatstone bridge circuit. The pressure transducer also contains support circuitry which allows adjustment of the signals to and from the Wheatstone bridge circuit to enable the pressure transducer to be used with various electrical measuring equipment which has different operational ranges.

2 Claims, 2 Drawing Figures

UNIVERSAL PRESSURE TRANSDUCER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to variable resistance pressure gauges, and more particularly to pressure transducers which use Wheatstone bridge circuits.

Wheatstone bridge circuits are popular elements of transducers for converting physical forces into proportional direct currents. These physical forces include: mechanical movements, temperatures, fluid flows and pressures. Exemplary in the art of using Wheatstone bridge circuits are the systems disclosed in the following U.S. Patents, the disclosures of which are incorporated by reference:

U.S. Pat. No. 2,871,698 issued to L. Bagby;
U.S. Pat. No. 2,906,980 issued to M. Traite;
U.S. Pat. No. 2,976,865 issued to R. Shipley;
U.S. Pat. No. 3,161,821 issued to J. Price et al;
U.S. Pat. No. 3,048,770 issued to D. Nye et al; and
U.S. Pat. No. 4,131,088 issued to J. Reddy.

All of the references cited above disclose various applications of Wheatstone bridge circuit technology. Particular attention should be directed towards the Wheatstone bridge transducer system of J. Price et al, which provides a tutorial covering the function of the Wheatstone bridge. However, while these references are instructive, they also serve to illustrate that there exists virtually limitless needs which may be satisfied by applications of Wheatstone bridge technology. The present invention is intended to satisfy one such need.

SUMMARY OF THE INVENTION

The present invention is a Wheatstone bridge pressure transducer which measures the pressure of samples of either liquids or gas using: a pressure port header; an isolation diaphragm; an oil-filled cavity; an active diaphragm; and four resistive elements which are configured in a Wheatstone bridge.

The gas or liquid to be measured is applied through a pressure port header and fills the volume in front of an isolation diaphragm. The isolation diaphragm exerts a force into an oil filled cavity which, in turn, is applied to an active diaphragm. The active diaphragm then deflects four resistive elements placed in a Wheatstone bridge configuration. This deflection causes an electrical voltage to be produced at the output of the Wheatstone bridge. This output voltage reflects the pressure to be measured.

The support circuity of the Wheatstone bridge allows the user basically four major operational modes to fit varying test conditions. The first mode is High/High in which 28 volts direct current is applied and 5 volts direct current is the full scale output. The second mode is High/Low in which 28 volts direct current is applied and 80 millivolts direct current is the full scale output. The third mode is Low/Low in which 2 to 10 volts direct current is applied and 16 to 80 millivolts direct current is the full scale output. The fourth is High/High-Low in which 28 volts direct current is applied and a 5 volt direct current output signal and in parallel an 80 millivolt direct current signal is present at the connector. The user must insure that the recording equipment does not load the circuit and cause erroneous outputs in the High/High-Low mode.

This support circuitry provides the means of varying the amplitudes of signals both to and from the Wheatstone bridge circuit so that the output signal of the transducer can be varied to fit the operational ranges of test measuring equipment which is used with the pressure transducer.

It is an object of the present invention to provide a transducer system which measures the pressure of samples of either liquids or gas.

It is another object of the present invention to produce an electrical signal which is proportional to the measurement of pressure.

It is another object of the present invention to measure pressure in different operational modes for varying test conditions.

These objects together with other objects, features and advantages of the invention will become more readily apparent from the following detailed description when taken in conjunction with the acompanying drawings wherein like elements are given like reference numerals throughout.

DETAILED DESCRIPTION OF THE PREFERRED EMBODIMENT

The present invention is a Wheatstone bridge pressure transducer which measures the pressure of samples of liquids or gas by producing an electrical output signal which is proportional to the pressure.

Figure 1:
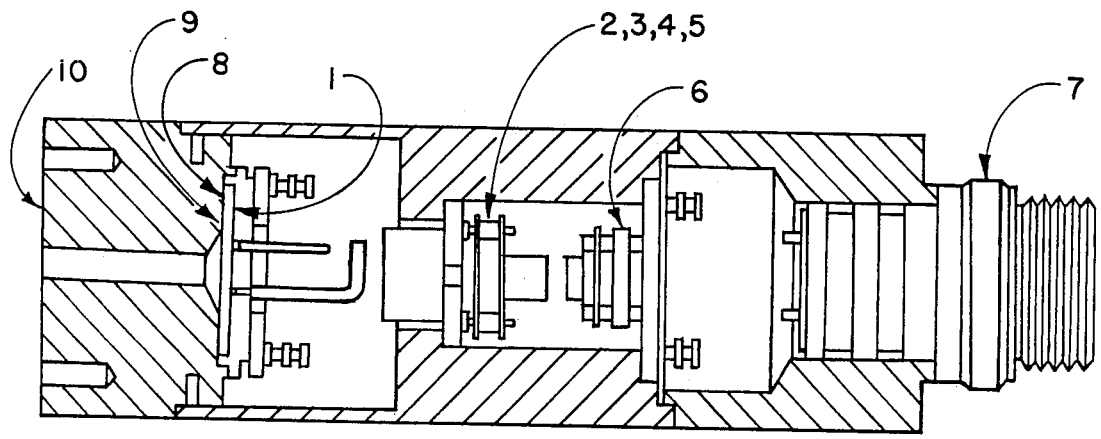
FIG. 1 is an illustration of the preferred embodiment of the transducer of the present invention.

The reader's attention is now directed towards FIG. 1, which is an illustration of the preferred embodiment of the present invention. The transducer of FIG. 1 produces a measurement of pressure using: an active diaphragm 1; an operational amplifier 2; a direct current voltage regulator 3; a calibration resistor 4; a set of diodes 5; a temperature compensation module 6; a case mounted connector 7; a cavity in a housing 8; an isolation diaphragm 9; and a pressure port header 10. A discussion of the characteristics of each of these elements is presented below as well as a discussion of the operation of the transducer.

The active diaphragm 1 is a pressure sensitive diaphragm upon which four resistive elements have been deposited/attached arranged electrically in a Wheatstone bridge arrangement. The operational amplifier 2 is an electronic module with a nominal amplification factor of 80. The direct current voltage regulator 3 has an input of 28 volts direct current (plus or minus 4 volts) with output of 10 volts constant direct current.

The calibration resistor 4 is a fixed value resistor which, when electrically placed across the minus excitation to minus signal leg of the Wheatstone bridge, produces a fixed output from the transducer.

The diodes 5 are devices used to block the application of volts, into the output of the regulator 3 when the transducer is operated in the low excitation mode of operation.

The temperature compensation module 6 is used to compensate for static thermal effects over the ranges specified and provide feedthru pins. The case mounted connector 7 provides all functions on appropriate pins for user to enable.

The cavity in the frame 8 is between isolation diaphragm and active diaphragm, and is filled with silicone oil. It provides thermal isolation from the measurand (the liquid or gas which is being measured for its pressure).

The isolation diaphragm 9 is composed of corrosion resistive material upon which the measurand acts. The pressure port header 10 provides for mechanical mounting and a port to isolation diaphragm for the measurand.

The operation of the transducer of FIG. 1 is as follows. The measurand (gas or liquid pressure) is applied through the pressure port header 10. This pressure fills the volume in front of the isolation diaphragm 9. The measurand, therefore, exerts a force upon the isolation diaphragm which displaces it an amount dependent upon the pressure level. The isolation diaphragm 10 exerts a force into the cavity 9 which is filled with silicone oil. This captive oil filled volume in turn transmits the applied pressure to the active diaphragm 1. The active diaphragm deflects an amount proportional to the pressure applied. This deflection causes the four resistive elements to be placed in compression and tension (two each elements in tension, two each elements in compression). The excitation voltage is applied across opposite ends of the Wheatstone bridge. The excitation voltage is applied in high mode by 28 volts direct current, passes through the regulator 3 and is reduced to 10 volts direct current, passes through the diodes 5 to the Wheatstone bridge. This output signal in millivolts direct current is applied to the operational amplifier 2. The amplifier with a nominal gain of 80 amplifies that signal to an output of 5.0 volts direct current. The signal is connected to pins 7 and 6 of the case mounted connector 7. In the low mode of excitation, 2 to 10 volts direct voltage regulated is applied to pins 3 and 8 of the case mounted connector 7. The voltage is blocked from the output of the regulator 3 by the diodes 5. The voltage, therefore, is correctly applied to the Wheatstone bridge. The compression/tension exerted upon the resistive elements causes a change in resistance which in turn causes an electrical voltage change to be produced at the output of the Wheatstone bridge. In the low mode of operation, the output signal from the active diaphragm 1 is applied directly to pins 9 and 10 of the case mounted connector 7. The full scale signal output level is nominally 8 millivolts of signal per volt of applied excitation.

This transducer offers the user basically four major operational modes to fit varying test conditions. The first mode is High/High in which 28 volts direct current is applied and 5 volts direct current is the full scale output. The second mode is High/Low in which 28 volts direct current is applied and 80 millivolts direct current is the full scale output. The third mode is Low/Low in which 2 to 10 volts direct current is applied and 16 to 80 millivolts direct current is the full scale output. The fourth is High/High-Low in which 28 volts direct current is applied and a 5 volt direct current output signal and in parallel an 80 millivolt direct current signal is present at the connector. The user must insure that the recording equipment does not load the circuit and cause erroneous outputs in the High/High-Low mode.

The connector 7 allows the user to externally short pins 5 and 4 which electrically place the resistor 4 across one element of the Wheatstone bridge. This resistance in parallel to the existing leg results in an artificial unbalance of the Wheatstone bridge. The value of the resistor 4 has been chosen to match the characteristics of the Wheatstone bridge to produce an 80% of full scale output signal in volts direct current to verify operational status of the transducer.

The case mounted connector 7 pin 11 is connected to the transducer's case. This provides the user the ability to ground cable shields through the connector and its mounting hardware.

Figure 2:
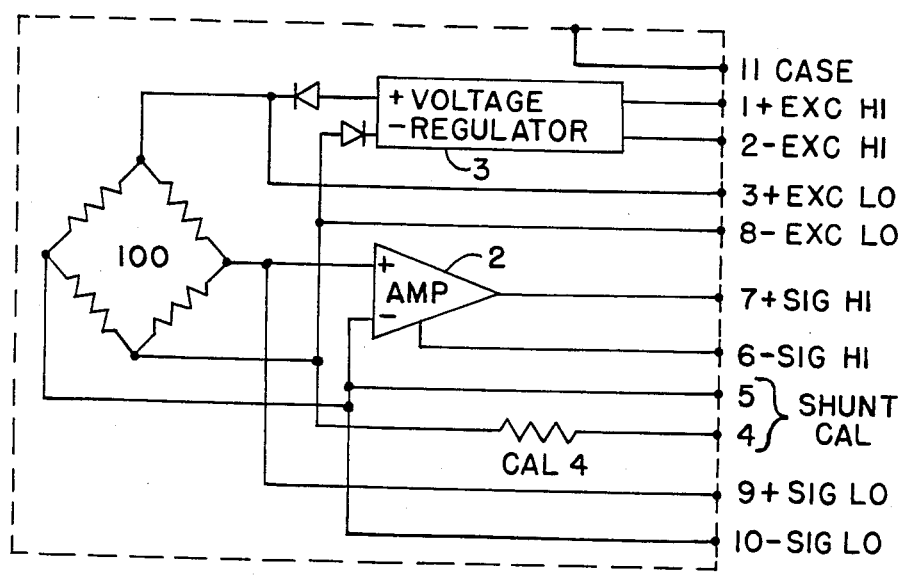
FIG. 2 is an electrical schematic of the circuit which supports the Wheatstone bridge circuit used in the transducer of FIG. 1.

FIG. 2 is an electrical schematic which depicts the interconnection of the Wheatstone bridge 11, the voltage regulator 3 and the operational amplifier 2 used in the transducer of FIG. 1. The case mounted connector includes the eleven pins which are enumerated on the right side of the schematic of FIG. 2. The assignment of these eleven pins is listed below in Table 1.

TABLE 1

| WIRING CHART | |
|---|---|
| PIN NO. | ASSIGNMENT |
| 1 | + Excitation, High |
| 2 | − Excitation, High |
| 7 | + Signal, High |
| 6 | − Signal, High |
| 4 | Shunt Cal |
| 5 | Shunt Cal |
| 9 | + Signal, Low |
| 10 | − Signal Low |
| 3 | + Excitation, Low |
| 8 | − Excitation, Low |
| 11 | Case |

The function of the circuit of FIG. 2 is to provide a means of varying the amplitudes of signals both to and from the Wheatstone bridge circuit. This gives the transducer of the present invention a flexibility which allows it to be used with a variety of test measuring equipment which has different operational ranges. As described above, the voltage regulator 3 sets the voltage amplitude from voltage supplied by an external source while the diodes rectify the signal into a direct current signal. The operational amplifier 2 amplifies the output signals of the Wheatstone bridge circuit 11 when the test equipment measures signals with comparatively high amplitudes, but the operational amplifier 2 may be bypassed and signals from the Wheatstone bridge circuit 11 output directly by the case mounted connector when the test equipment measures signals with comparatively low amplitudes.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A pressure transducer comprising:
   a frame which has a pressure port header which allows the transducer to be mechanically mounted at a point where a measurement of pressure is required;
   an isolation diaphragm which is mounted within said frame and is displaced by pressure which enters the pressure point header in the frame;
   an active diaphragm which is mounted in said frame in proximity to said isolation diaphragm and is displaced by pressure generated by said isolation diaphragm when the isolation diaphragm is displaced;

a Wheatstone bridge circuit which is mounted on the active diaphragm, said Wheatstone bridge circuit receiving input electrical signals and producing output electrical signals which are proportional to the pressure exerted on the pressure transducer;

a means for thermally isolating the active diaphragm from the isolation diaphragm, said thermally isolating means conveying pressure from the isolation diaphragm to the active diaphragm when the isolation diaphragm is displaced while thermally insulating the active diaphragm from the isolation diaphragm; wherein said thermally isolating means comprises a reservoir of silicone oil placed in said frame between said isolation diaphragm and said active diaphragm to hydraulically conduct pressure from the isolation diaphragm to the active diaphragm while providing some thermal insulation about the active diaphragm, said thermal insulation preventing thermal corruption of the output electrical signals of said Wheatstone bridge circuit;

a case mounted connector which is housed in said frame and has a plurality of pins to conduct an input signal from an external voltage source and to output said output electrical signals from said Wheatstone bridge circuit; and a voltage regulator circuit which is electrically connected to said case mounted connector and said Wheatstone bridge circuit to convert said input voltage signal from said external voltage source into the input electrical signals by rectifying said input voltage signal into a direct current signal and regulating amplitudes of the input voltage signal to produce said input electrical signals with varied amplitudes so that the output signals of the Wheatstone bridge are varied to fit operational parameters of test measuring equipment used with the pressure transducer.

2. A pressure transducer, as defined in claim 1, wherein said voltage regulator circuit comprises:

a voltage regulator which is electrically connected to said case mounted connector to produce an output signal regulating the input voltage signal received therefrom;

diodes which are electrically connected between the Wheatstone bridge circuit and the voltage regulator to rectify the output signal of the voltage regulator and produce the input electrical signals for the Wheatstone bridge circuit;

a calibration resistor which is electrically connected to the Wheatstone bridge circuit and the case mounted connector to produce a fixed output from the output electrical signals of the Wheatstone bridge circuit; and an operational amplifier which is electrically connected between the Wheatstone bridge circuit and the case mounted connector to amplify the output electrical signals of the Wheatstone bridge circuit when the test equipment measures signals with comparatively high amplitudes, said operational amplifier being bypassed to allow said case mounted connector to output said output electrical signals directly from said Wheatstone bridge circuit when said test equipment measures signals with comparatively low amplitudes.

* * * * *